US009527949B2

(12) United States Patent
Wu et al.

(10) Patent No.: US 9,527,949 B2
(45) Date of Patent: Dec. 27, 2016

(54) POLYURETHANE GROUT COMPOSITIONS

(71) Applicant: Huntsman International LLC, The Woodlands, TX (US)

(72) Inventors: Xiaodong Wu, Shanghai (CN); Yueping Dai, Shanghai (CN); Zhi Peng, Shanghai (CN)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 14/396,440

(22) PCT Filed: Apr. 23, 2013

(86) PCT No.: PCT/CN2013/074547
§ 371 (c)(1),
(2) Date: Oct. 23, 2014

(87) PCT Pub. No.: WO2013/174189
PCT Pub. Date: Nov. 28, 2013

(65) Prior Publication Data
US 2015/0087738 A1    Mar. 26, 2015

(30) Foreign Application Priority Data
May 25, 2012    (CN) .......................... 2012 1 0165791

(51) Int. Cl.
*C08G 18/10* (2006.01)
*C08G 18/83* (2006.01)
(Continued)

(52) U.S. Cl.
CPC ............. *C08G 18/837* (2013.01); *C08G 18/10* (2013.01); *C08G 18/12* (2013.01); *C08G 18/283* (2013.01);
(Continued)

(58) Field of Classification Search
None
See application file for complete search history.

(56) References Cited

U.S. PATENT DOCUMENTS

| 5,021,520 A | 6/1991 | Reiff et al. |
| 5,354,808 A | 10/1994 | Onwumere et al. |

(Continued)

FOREIGN PATENT DOCUMENTS

| CA | 2 713 384 | 2/2011 |
| CN | 1083563 | 9/1994 |

(Continued)

OTHER PUBLICATIONS

Yang, et al.; "Water-proof Materials and Construction"; New Building Materials; pp. 18-20; Aug. 2001.
(Continued)

*Primary Examiner* — Jeffrey Washville
(74) *Attorney, Agent, or Firm* — Huntsman International LLC

(57) ABSTRACT

The present invention typically provides one-component polyurethane grout compositions and more specially to grout composition useful for seepage control and quick stoppage of water leakage under high water pressure environment, wherein the composition comprises a isocyanate prepolymer and auxiliary components selected from a plasticizer, a silane coupling agent, a catalyst, a cell stabilizer, an anionic surfactant, a filler, a blowing agent or a mixture thereof. The invention also provides the isocyanate prepolymer composition, obtained by reacting a polyfunctional isocyanate, with a polyfunctional polyol comprising at least one polyether polyol containing relatively low amount of ethylene oxide units, and optionally other polyfunctional polyols such as polyester polyols, biorenewable polyols or a mixture thereof, and at least a monofunctional hydroxyl containing compound, wherein the NCO content of said prepolymer is
(Continued)

3%~18%. The resulting grout composition can cure into a solid under water pressure from 1 MPa to 20 MPa.

12 Claims, 1 Drawing Sheet

(51) Int. Cl.
| | |
|---|---|
| *C08L 83/08* | (2006.01) |
| *C08G 18/48* | (2006.01) |
| *C08G 18/58* | (2006.01) |
| *C08G 18/66* | (2006.01) |
| *C08G 18/28* | (2006.01) |
| *C08G 18/36* | (2006.01) |
| *C08G 18/40* | (2006.01) |
| *C08G 18/42* | (2006.01) |
| *C08G 18/76* | (2006.01) |
| *C08G 18/12* | (2006.01) |
| *C08G 77/26* | (2006.01) |
| *C08G 101/00* | (2006.01) |

(52) U.S. Cl.
CPC ............ *C08G 18/289* (2013.01); *C08G 18/36* (2013.01); *C08G 18/4018* (2013.01); *C08G 18/4045* (2013.01); *C08G 18/4211* (2013.01); *C08G 18/485* (2013.01); *C08G 18/4825* (2013.01); *C08G 18/4829* (2013.01); *C08G 18/58* (2013.01); *C08G 18/6696* (2013.01); *C08G 18/7657* (2013.01); *C08L 83/08* (2013.01); *C08G 77/26* (2013.01); *C08G 2101/0016* (2013.01); *C08G 2101/0025* (2013.01); *C08G 2101/0083* (2013.01); *C08G 2190/00* (2013.01)

(56) References Cited

U.S. PATENT DOCUMENTS

| | | | |
|---|---|---|---|
| 5,554,709 A * | 9/1996 | Emmerling | C08G 18/10 525/452 |
| 5,556,891 A | 9/1996 | Seifert et al. | |
| 5,821,275 A | 10/1998 | Madan et al. | |
| 6,657,035 B1 | 12/2003 | Nakata et al. | |
| 2002/0042469 A1* | 4/2002 | Grandhee | 524/539 |
| 2004/0079482 A1* | 4/2004 | Zhang et al. | 156/327 |
| 2005/0148726 A1* | 7/2005 | Coggio et al. | 524/589 |
| 2008/0214769 A1* | 9/2008 | Pohl | C08G 18/12 528/44 |

FOREIGN PATENT DOCUMENTS

| | | |
|---|---|---|
| CN | 1129619 | 12/2003 |
| CN | 100343298 | 10/2007 |
| CN | 101056909 | 10/2007 |
| CN | 101402845 | 4/2009 |
| CN | 100506874 | 7/2009 |
| CN | 101993521 | 3/2011 |
| CN | 102079862 | 6/2011 |
| CN | 102079863 | 6/2011 |
| CN | 102093536 | 6/2011 |
| CN | 102093537 | 6/2011 |
| CN | 102070761 | 7/2012 |
| CN | 101772530 | 8/2012 |
| CN | 102702728 | 10/2012 |
| CN | 101268149 | 7/2014 |
| WO | 2008/134359 | 11/2008 |
| WO | 2008/134371 | 11/2008 |
| WO | 2010/067126 | 6/2010 |

OTHER PUBLICATIONS

Feng, et al.; "Development and Application of New Waterproof Grouting Materials of Polyurethane"; Chinese Journal of Geotechnical Engineering; vol. 32 No. 3; pp. 375-380; Mar. 2010.

Chen, et al.; "Research and Application of the Low-Permeability Filming Drilling Fluid"; Journal of Chengdu University of Technology (Science & Technology Edition); vol. 36 No. 5; pp. 498-503; Oct. 2009.

Liu, et al.; "Mechanism of Mud Job and Rotary Drilling Technology in Sand and Gravel"; Journal of Central South University (Science & Technology); vol. 41 No. 1; pp. 265-271; Feb. 2010.

* cited by examiner

POLYURETHANE GROUT COMPOSITIONS

This application is the National Phase of International Application PCT/CN2013/074547 filed Apr. 23, 2013 which designated the U.S. and which claims priority to Foreign Application No. 201210165791.4 filed May 25, 2012. The noted applications are incorporated herein by reference.

FIELD OF THE INVENTION

This invention relates generally to polyurethane grout compositions and more specially to grout compositions useful for seepage control and quick stoppage of water leakage under high water pressure environment.

BACKGROUND INFORMATION

Water reactive polyurethane grout materials have been introduced into grouting industry for decades. It is well known that polyurethane grout materials can react with the in-situ water to form a foam or gel. Numerous successes are reported using polyurethane grouts for water leakage and seepage control in mining and geotechnical engineering projects due to high reactivity of isocyanates and high dilution ratio with water. However, a major challenge underlying polyurethane grout materials to be used under high water pressure environment with performance needed including reactivity, mechanical properties, adhesion and durability has not been addressed. This is especially important for applications, such as core drilling exploration for mining and shale gas, foundation excavation and quick seepage control for underground tunnel joints. Therefore, it would be desirable to develop a polyurethane grout composition which could meet the grouting needs of the application under high water pressure environment.

In the prior art, WO2008134359 discloses elastomer compositions of blocked isocyanate prepolymer used in downhole applications. WO2008134371 describes using silane terminated polymers as grout materials and releases a method of treating an earth formation comprising introducing at least one curable liquid composition intended to form an elastomer in a liquid phase into the earthen formation; introducing at least one curing agent into the earthen formation; and contacting the at least one curable liquid composition and the at least one curing agent to form a non-aqueous gel. Although WO2008134359 and WO2008134371 describe the grout application for core drilling exploration, these patents clearly are not focused on polyurethane prepolymer design and composition.

In addition, WO2010067126 describes compositions comprising a potassium silicate and/or sodium silicate powder having a water content of substantially 0% w/w and an isocyanate, processes for preparing and hardening these compositions, a rock bolt filled with the composition and a rock bolting capsule formed by a water impermeable membrane and containing the composition. CA2713384 emphasizes on using silane materials for grout application. US2005148726 describes a specialized application of polyurethane materials with improvement on stain resistance by incorporation of fluoro-materials.

Other two related patents include CN102093536, which relates to a polyurethane prepolymer, a polyurethane grouting material and a preparation method thereof, and CN102079862 which discloses a single-component oil-soluble polyurethane grouting material, and raw materials and a preparation method thereof. However, it is found that neither these two hydrophobic grouting materials described in CN102093536 and CN102079862 can cure under water pressure above 1 MPa.

CN102093537 discloses a preparation method of a waterborne polyurethane grouting material. Isocyanate, retarding agent and hydrophilic polyether polyol are mixed to react and obtain the finished product.

CN102079863 discloses a single-component hydrophilic polyurethane grouting material, as well as raw materials and a preparation method thereof.

The grouting material of CN102093537 and CN102079863 are both hydrophilic PU grout. According to the testing results of the present invention, such grouting material forms a gel with poor mechanical properties and poor adhesion to the substrate under high water pressure.

After a thorough prior art study, it is found that none of the documents cited above teaches or suggests the present invention.

SUMMARY OF THE INVENTION

It has now been surprisingly found that the compositions and processes of the present invention meet the above challenge. Advantages of the present invention may include: (1) fast curing in high water pressure environment; (2) quick stoppage of water or fluid leakage; and (3) sealing the crack with good bonding strength and better mechanical properties and impact resistance for durability.

The present invention is concerned with polyurethane grout materials and processes for preparing these materials. In one embodiment, the invention provides a polyurethane grout composition wherein the composition—comprises an isocyanate prepolymer and auxiliary components selected from a plasticizer, a silane coupling agent, a catalyst, a cell stabilizer, an anionic surfactant, a filler, a blowing agent or a mixture thereof.

In another embodiment, the present invention provides an isocyanate prepolymer composition, obtained by reacting a polyfunctional isocyanate with a polyfunctional polyol comprising at least one polyether polyol containing between 0 and 50 wt % of ethylene oxide units based on the total alkylene oxide units, and optionally other polyfunctionals polyols such as polyester polyols, biorenewable polyols or a mixture thereof, and at least one monofunctional hydroxyl containing compound such as polyethylene oxide polymer with terminal hydroxyl group, polyoxyethylene-polyoxypropylene Monols or a mixture thereof.

In still another embodiment, the present invention provides a process for preparation of the isocyanate prepolymer composition and the polyurethane grout composition of the invention.

In yet another embodiment, the present invention provides the use of the polyurethane grout compositions for quick stoppage of liquid leakage and seepage control in core drilling exploration for mining and shale gas, foundation excavation, and underground tunnel joints.

DETAILED DESCRIPTION

Figure 1:
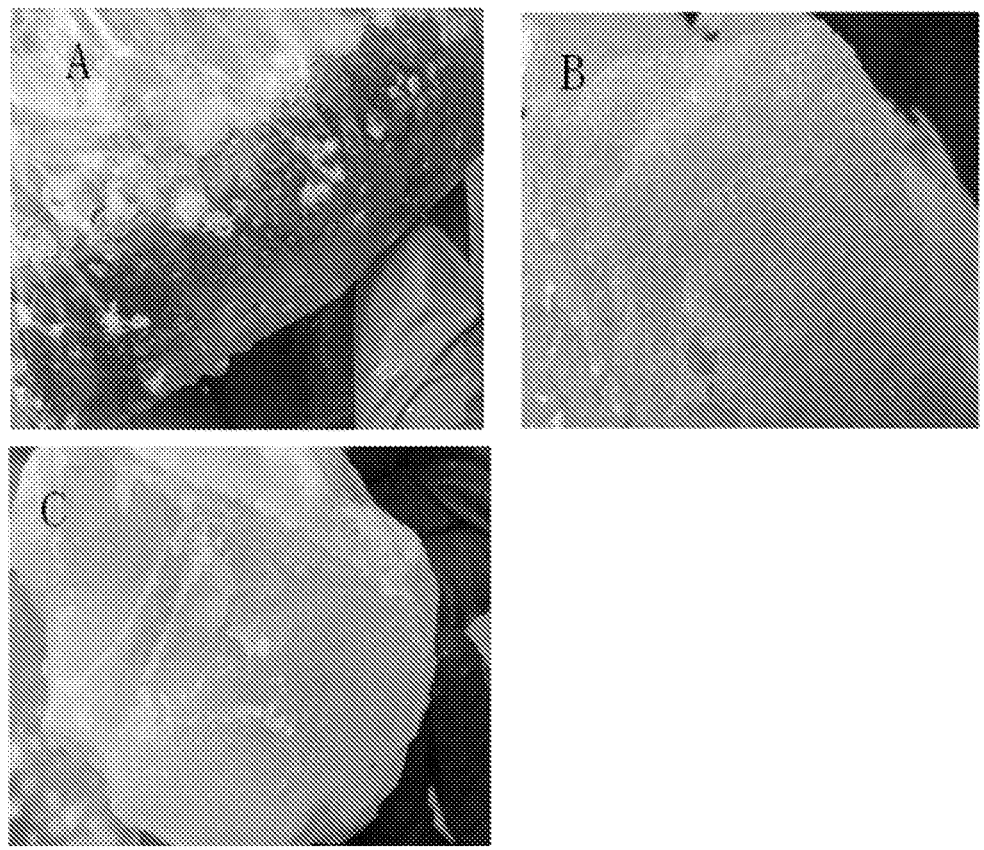
FIG. 1A demonstrates the reactivity of a typical hydrophobic polyurethane grout (Example 3) reported in the prior art under high water pressure. The grout is allowed to react with water under 1 MPa for 10 minutes, however, the mixture still remained in liquid form and little reaction is observed. Only after the water pressure is removed, the hydrophobic PU grout quickly foamed and cured into rigid foam in 10 seconds (FIG. 1B)
FIG. 1C show the reactivity of an hydrophilic polyurethane grout (Example 4) and the hydrophilic PU grout cured into soft gel under 10 MPa
Figure 2:
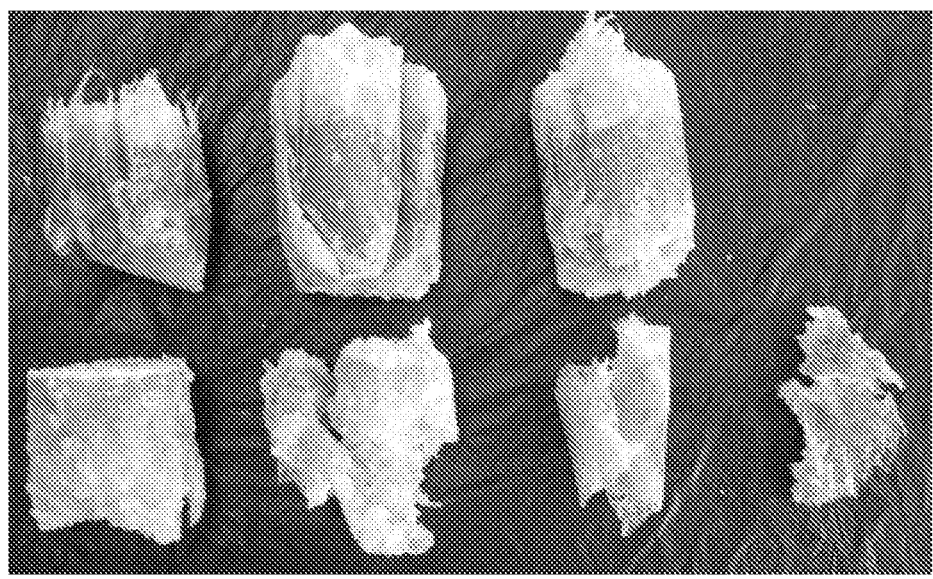
FIG. 2 is a representation of PU grout materials of the present invention (Examples 1 and 2) which cured in 5~10 minutes under 3 MPa water pressure; a solid materials is obtained.

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

It should be clear that the term "polyurethane (PU)", as used herein, is not limited to those polymers which include only urethane or polyurethane linkages. It is well understood by those of ordinary skill in the art of preparing polyurethanes that the polyurethane polymers may also include allophanate, carbodiimide, uretidinedione, and other linkages in addition to urethane linkages.

The present invention generally provides an isocyanate prepolymer composition, obtained by reacting a polyfunctional isocyanate, a polyfunctional polyol comprising at least one polyether polyol containing between 0 and 50 wt % ethylene oxide units based on the total alkylene oxide units, and a monofunctional hydroxyl containing compound (hereinafter referred to under the term "Monol" for sake of convenience).

According to one embodiment, the polyfunctional isocyanate includes those represented by the formula $Q(NCO)_n$ where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biruret groups; polyfunctional isocyanates obtained by telomerization reactions; polyfunctional isocyanates containing ester groups; and polyfunctional isocyanates containing polymeric fatty acid groups. Those skilled in the art will recognize that it is also possible to use mixtures of the polyfunctional isocyanates described above, preferably using mixture of polymeric MDI and mixture of MDI isomers, such as MI50 (MI 50 is a mixture of 50 wt % 2,4'-MDI and 50 wt % 4,4'-MDI).

The weight ratio of polymeric MDI to MDI isomer mixture may be between 0.25 and 10, preferably between 0.5 and 4.

In one embodiment, the present invention contains 10% to 30% weight fractions of MDI isomer mixture based on the grout composition.

The polyfunctional polyols suitable for use in the present invention may include, but are not limited to, polyether polyols, polyester polyols, biorenewable polyols, polymer polyols, a non-flammable polyol such as a phosphorus-containing polyol or a halogen-containing polyol. Such polyols may be used alone or in suitable combination as a mixture.

General functionality of polyols used in the present invention is between 2 to 3. The MW of polyols may be between 500 and 10,000, preferably between 500 and 5,000.

The proportion of said polyfunctional polyols is generally of between 10 and 80% by weight, preferably between 20 and 50% based on the grout composition.

Polyether polyols for use in the present invention include alkylene oxide polyether polyols such as ethylene oxide polyether polyols and propylene oxide polyether polyols and copolymers of ethylene and propylene oxide with terminal hydroxyl groups derived from polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, and similar low molecular weight polyols.

Unlike many other prior art PU grout compositions, the present PU grout composition comprises a prepolymer derived from at least one polyether polyol comprising relatively low amount of ethylene oxide units, typically between 0 wt % and 50 wt %, preferably between 5 wt % and 30 wt %, most preferably between 10 and 20 wt % based on the total alkylene oxide units present in said polyether polyol. Said polyether polyol containing relatively low amounts of ethylene oxide units is generally present in amounts ranging between 0 and 60 wt %, preferably between 10 and 50% based on the prepolymer composition.

Polyester polyols for use in the present invention include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present invention may also include: linear or lightly branched aliphatic (mainly adipates) polyols with terminal hydroxyl group; low molecular weight aromatic polyesters; polycaprolactones; polycarbonate polyol. Those linear or lightly branched aliphatic (mainly adipates) polyols with terminal hydroxyl group are produced by reacting a dicarboxyl acids with an excess of diols, triols and their mixture; those dicarboxyl acids include, but are not limited to, for example, adipic acid, AGS mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol. Those low molecular weight aromatic polyesters include products derived from the process residues of dimethyl terephalate (DMT) production, commonly referred to as DMT still bottoms, products derived from the glycolysis of recycled poly(ethyleneterephthalate) (PET) bottles or magnetic tape with subsequent re-esterification with di-acids or reaction with alkylene oxides, and products derived by the directed esterification of phthalic anhydride. Polycaprolactones are produced by the ring opening of caprolactones in the presence of an initiator and catalyst. The initiator includes ethylene glycol, diethylene glycol, propylene glycol, dipropylene glycol, 1,4-butane diol, 1,6-hexane diol, glycerol, trimethylolpropane and pentaerythritol. Polycarbonate polyols are derived from carbonic acid—that can be produced through the polycondensation of diols with phosgene, although transesterification of diols, commonly hexane diol, with a carbonic acid ester, such as diphenylcarbonate.

Biorenewable polyols suitable for use in the present invention include castor oil, sunflower oil, palm kernel oil, palm oil, canola oil, rapeseed oil, soybean oil, corn oil, peanut oil, olive oil, algae oil, and mixtures thereof.

Examples of polyfunctional polyols also include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol. The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrine or trichlorobutylene oxide.

The invention may allow controlling the hydrophilicity of the PU grout composition of the present invention, by changing the amount of Monol which helps to emulsify the prepolymer in water.

In one embodiment, the monofunctional hydroxyl containing compound is a polyethylene oxide polymer with terminal hydroxyl group, polyoxyethylene-polyoxypropylene Monols or a mixture thereof, preferably Methoxypolyethylene Glycol (MOPEG). The molecular weight (MW) of the Monol may be between 100 and 10,000, preferably between 200 and 5,000.

In still another embodiment, the Monol proportion by weight percentage of isocyanate prepolymer is between 0.1 and 10, preferably between 0.5 and 6.

According to one embodiment, the NCO/OH ratio of isocyanate groups present in the prepolymer to hydroxyl groups present in the prepolymer is between 1:0.02 and 1:0.5, preferably between 1:0.05 and 1:0.1.

The NCO content of the prepolymer of the present invention is generally between 3 and 18 wt %.

In the present invention, the PU grout composition may further include one or more auxiliary components. Examples of auxiliary components include, but are not limited to, plasticisers, silane coupling agent, catalysts, cell stabilizers, anionic surfactants, fillers, blowing agents or any combination thereof.

In one embodiment, the proportion of the auxiliary components present in the PU grout composition is of between 5 and 80 wt %, preferably between 10 and 60 wt %.

Plasticisers may include, but are not limited to, phthalate plasticizers, terephthalate plasticizers, sulfonamide plasticizers, benzoate plasticizers and phosphate plasticizers. Those plasticizers are commercially available, such as dibutyl phthalate (DBP), di-isobutyl phthalate (DIBP), dioctyl phthalate (DOP), triaryl phosphates (such as TEP), 1,4-CHDM dibenzoate, dipropylene glycol dibenzoate, diethylene glycol dibenzoate, isononyl benzoate, glycerol tribenzoate, and phenyl esters of sulfonated n-paraffins produced by companies such as Bayer AG (Mesamoll and Mesamoll II). More preferably is propylene carbonate, dibasic ester (DBE), triethylphosphate and any combination thereof.

The silane coupling agent for use in the present invention include those represented by the formula $X—R—Si—(Y)_3$, where X may be an isocyanate reactive group selected from amine group, hydroxyl group, or thiol group, Y may be an alkoxy group, and R is selected from the groups comprising aromatic or aliphatic ester groups.

The proportion of the silane coupling agent present in the PU grout composition may be of between 0.05 and 10 wt %, preferably between 0.1 and 5 wt %, such as between 0.5 and 3 wt %.

It has now been surprisingly found that by adding silane coupling agent the PU grout composition better adhesive strength to the substrates is obtained.

Catalysts which enhance the formation of urethane and urea bonds may be used, for example, tin compound, such as a tin salt of a carboxylic acid, e.g. dibutyltin dilaurate, stannous acetate and stannous octoate; amines, e.g. dimethylcyclohexylamine and triethylene diamine.

Cell stabilizers may include, for example, silicon surfactants or anionic surfactants. Examples of suitable silicon surfactants include, but are not limited to, polyalkylsiloxane, polyoxyalkylene polyol-modified dimethylpolysiloxane, alkylene glycol-modified dimethylpolysiloxane, or any combination thereof.

Suitable anionic surfactants include, but are not limited to, salts of fatty acids, salts of sulfuric acid esters, salts of phosphoric acid esters, sulfonates, or any combination thereof.

Fillers may be used to increase the density and load bearing properties of polyurethane foams. Suitable fillers include, but are not limited to, barium sulfate or calcium carbonate.

A blowing agent may also be added to the formulation, which may either be an exothermic or endothermic blowing agent or a combination of both. Any known blowing agent used in the preparation of foam may be used in the present invention as a blowing agent. Examples of chemical blowing agents include gaseous compounds such as nitrogen or carbon dioxide, gas (e.g. $CO_2$) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures. Examples of physical blowing agents include volatile liquids such as chlorofluorocarbons, partially halogenated hydrocarbons or non-halogenated hydrocarbons like propane, n-butane, isobutane, n-pentane, isopentane and/or neopentane.

The present invention also provides a process for the preparation of the isocyanate prepolymer which comprises the reaction of a polyfunctional isocyanate, a polyfunctional polyol comprising at least one polyether polyol containing a relatively low amount of ethylene oxide units as described above, and a monofunctional hydroxyl containing compound. A preferably way to react is first to mix a polyfunctional polyol, and a monofunctional hydroxyl containing compound, and then add a polyfunctional isocyanate to obtain an isocyanate prepolymer composition.

The present invention also provides a process for preparation of the PU grout composition of the invention, by adding the necessary auxiliary components to the isocyanate prepolymer.

The synthesis processes of isocyanate prepolymer are known in the art (see for example Polyurethanes Handbook $2^{nd}$ edition, G. Oertel, 1994).

Furthermore, the present invention also provides the use of the polyurethane grout compositions and isocyanate prepolymer compositions for quick stoppage of liquid leakage and seepage control in core drilling exploration for mining and shale gas, foundation excavation, and underground tunnel joints.

In one embodiment, the PU grout composition is delivered to a targeted water leakage zone of an underground mining exploration site where the water pressure is above 3 MPa. The composition is cured to form a solid in about 30 minutes and the water leakage problem is resolved. Later the sample was taken out and found that the grout material has achieved excellent adhesion to the surroundings and the hardness of the solid could reach Shore A 85.

The grout composition of the present invention can cure into a solid under water pressure from 1 MPa to 20 MPa.

The examples which now follow should be considered exemplary of the present invention, and not delimitive thereof in any way.

Raw Materials

Isocyanate A: polyfunctional isocyanate compounds with functionality around 2.8, isocyanate value around 30% by wt NCO groups (group wt=42);
Isocyanate B: MDI isomers and their mixtures compounds with isocyanate value of 33.5% by wt NCO groups (group wt=42);
Isocyanate C: emulsifiable polyfunctional isocyanate compounds with functionality around 2.7, isocyanate value around 29% by wt NCO groups (group wt=42);
Polyol A: a trifunctional propylene oxide-ethylene oxide polyether polyol with 10% ethylene oxide units in all alkylene oxide units; has a molecular weight around 4,000;
Polyol B: a bifunctional propylene oxide-ethylene oxide polyether polyol with 10% ethylene oxide units in all alkylene oxide units; has a molecular weight around 4,000;
Polyol C: a bifunctional propylene glycol based polyether polyol; has a molecular weight around 2,000;
Polyol D: a bifunctional glycol-phthalic anhydride based polyester polyol; has a molecular weight around 2,000;
Polyol E: a trifunctional epoxy-modified soybean oil based polyol; has a molecular weight around 800;
Monol F: a polyethylene glycol monomethyl ether with molecular weight around 800;
Polyol G: an ethylenediamine based polyether polyol with a molecular weight around 300;
DMDEE: 2,2'-dimorpholino diethyl ether
DBE: dibasic ester
TEP: triethylphosphate
Silane coupling agent: bis(trimethoxysilylpropyl)amine
Foam stable agent: TEGOSTAB® B8443 from Evonik Degussa Example 1

Formulation 27.4 parts by weight Polyol A
3.0 parts by weight Polyol D
39.3 parts by weight Isocyanate A
10.0 parts by weight Isocyanate B
13.3 parts by weight dibasic ester (DBE)
6.0 parts by weight Monol F
1 part by weight Bis(trimethoxysilylpropyl)amine Procedure All polyols and the auxiliary components, if necessary, were dried at 100° C. for 2~3 hours to have a water content of below 400 ppm. Polyols A and D, Monol F and isocyanates A and B were mixed in the proportions indicated above and stirred in a closed cup at 75° C. for 2 hours to obtain an isocyanate prepolymer composition. Then additives like DBE, Bis(trimethoxysilylpropyl)amine and catalyst DMDEE were charged to obtain the PU grout composition.

Results

After pour the resulting sample into water without mechanical mixing, and then imposing high water pressure on the sample, the sample cured into a solid in about 30 minutes under water pressure above 3 MPa.

Example 2

Formulation 41.7 parts by weight Polyol B
6.0 parts by weight Polyol E
22.0 parts by weight Isocyanate A
13.0 parts by weight Isocyanate B
11.3 parts by weight triethylphosphate (TEP)
4.0 parts by weight Monol F
2.0 part by weight Bis(trimethoxysilylpropyl)amine Procedure All polyols and the auxiliary components, if necessary, were dried at 100° C. for 2~3 hours to have a water content of below 400 ppm. Polyols B and E, Monol F and isocyanates A and B were mixed in the proportions indicated above and stirred in a closed cup at 75° C. for 2 hours to obtain an isocyanate prepolymer composition. Then additives like TEP, Bis(trimethoxysilylpropyl)amine and catalyst DMDEE were charged to obtain the PU grout composition.

Results

After pour the resulting sample into water without mechanical mixing, and then imposing high water pressure on the sample, the sample cured into a solid in about 30 minutes under water pressure above 3 MPa.

Example 3

Formulation 12.0 parts by weight Polyol C
48.3 parts by weight Isocyanate A
9.9 parts by weight Isocyanate B
29.4 parts by weight DBE (dibasic ester)
0.4 parts by weight Foam stable agent
Procedure All polyols and the auxiliary components, if necessary, were dried at 100° C. for 2~3 hours to have a water content of below 400 ppm. Polyol C and isocyanates A and B were mixed in the proportions indicated above and stirred in a closed cup at 75° C. for 2 hours to obtain an isocyanate prepolymer composition. Then additives like DBE, catalyst DMDEE and foam stabilizer B8443 were charged to obtain the PU grout composition.

Results

After pour the resulting sample into water without mechanical mixing, and then imposing high water pressure on the sample, the sample could not cure into a solid but remained a liquid form under water pressure above 1 MPa, even though it can form foam grout under ambient conditions. Accordingly, this example is a comparative example.

Example 4

Formulation 15.5 parts by weight Polyol A
40.1 parts by weight Polyol B
17.4 parts by weight Isocyanate B
27.0 parts by weight DBE (dibasic ester)
Procedure All polyols and the auxiliary components, if necessary, were dried at 100° C. for 2~3 hours to have a water content of below 400 ppm. Polyols A, B and isocyanate B were mixed in the proportions indicated above and stirred in a closed cup at 75° C. for 2 hours to obtain an isocyanate prepolymer composition. Then additives like catalyst DMDEE was charged to obtain the PU grout composition.

Results

After pour the resulting sample into water without mechanical mixing, and then imposing high water pressure on the sample, the sample cured into a soft gel in around 30 minutes. However, its adhesion performance on wet concrete surface was poor, and its soft gel form led to easily peel off during drilling process. Accordingly, this example is a comparative example.

Example 5

Formulation

The first part:
100 parts by weight Isocyanate C
The second part:
40 parts by weight Polyol G
40 parts by weight Dilute agent
20 parts by weight DBE
Procedure The two parts were mixed in a ratio of 1:1 by weight; the resulting sample was poured into water without mechanical mixing, and then high water pressure was imposed on the sample.

Results

The sample could not cure into a solid but remained a liquid form under water pressure above 1 MPa, even though it can form rigid solid form under ambient conditions. Accordingly, this example is a comparative example.

TABLE 1

Balance of hydrophilicity and hydrophobicity effect on Isocyanates Reactivity under high water pressure

|  | 1 MPa 10 minutes | 2 MPa 10 minutes | 5 MPa 10 minutes | 10 MPa 30 minutes |
|---|---|---|---|---|
| Example 3 | no reaction | no reaction | no reaction |  |
| Example 4 | gel | gel | gel | gel |
| Example 1 |  | solid | solid |  |

Table 1 shows that hydrophobic polyurethane grout very similar to what is described in CN102093536 and CN102079862A, can not cure under water pressure above 1 MPa, (FIG. 1A) even though it can form foam grout under ambient conditions (FIG. 1B). Hydrophilic polyurethane grout, very similar to those described in CN102093537 and CN102079863A, can cure to form a soft gel with poor mechanical properties under high water pressure (FIG. 1C). In addition, as shown in Table 2, the PU grout compositions of the present invention can achieve good film-forming and mechanical properties and good adhesion to the substrate under high water pressure, which is critical in quick response for fluid leakage control during core drilling exploration.

TABLE 2

PU grouts performance at Ambient condition vs. High water pressure

|  | Ambient conditions | | High water pressure | | |
|---|---|---|---|---|---|
|  | Adhesion to dry concrete | Curing sample | Adhesion to wet concrete | Curing sample | Film-forming under water |
| Example 3 | good | rigid foam | poor | no reaction | poor |
| Example 4 | good | gel | poor | gel | good |
| Example 2 | good | semi-rigid foam | good | solid | good |

What is claimed is:

1. A polyurethane grout composition obtained by adding a silane coupling agent to an isocyanate prepolymer, wherein the isocyanate prepolymer composition is obtained by reacting a polyfunctional isocyanate, a polyfunctional polyol, and a monofunctional hydroxyl containing compound, wherein the polyfunctional polyol comprises at least one polyether polyol containing 5-30 wt % ethylene oxide units based on the total alkylene oxide units and wherein the molecular weight of the monofunctional hydroxyl containing compound is between 100 and 800 and an NCO/OH ratio of isocyanate groups present to the hydroxyl groups present in the prepolymer composition is between 1:0.05 and 1:0.1.

2. The polyurethane grout composition of claim 1, wherein the polyfunctional isocyanate is a polymeric MDI or an MDI isomer mixture or a mixture thereof.

3. The polyurethane grout composition of claim 2, wherein the ratio of polymeric MDI to MDI isomer mixture is between 0.25 and 10.

4. The polyurethane grout composition of claim 1, wherein the portion of ethylene oxide containing polyether polyol by weight percentage of the prepolymer is between 10 and 50.

5. The polyurethane grout composition of claim 1, wherein the polyfunctional polyol further comprises a polyester polyol, a biorenewable polyol, or a mixture thereof.

6. The polyurethane grout composition of claim 1, wherein the monofunctional hydroxyl containing compound is a polyethylene oxide polymer with a terminal hydroxyl group, a polyoxyethylene-polyoxypropylene monol or a mixture thereof.

7. The polyurethane grout composition of claim 1, wherein the molecular weight of the polyfunctional polyol is between 500 and 5,000.

8. The polyurethane grout composition of claim 1, wherein the proportion of the monofunctional hydroxyl containing compound by weight percentage of the prepolymer is between 0.5 and 5.

9. The polyurethane grout composition according to claim 1, further comprising auxiliary components selected from a plasticiser, a catalyst, a cell stabilizer, an anionic surfactant, a filler, a blowing agent and a mixture thereof.

10. A process for preparation of the polyurethane grout composition of claim 1, comprising adding an silane coupling agent and optionally auxiliary components to an isocyanate prepolymer, wherein the auxiliary components are selected from a plasticiser, a silane coupling agent, a catalyst, a cell stabilizer, an anionic surfactant, a filler, a blowing agent and a mixture thereof.

11. The polyurethane grout composition of claim 2, wherein the ratio of polymeric MDI to MDI isomer mixture is between 0.5 and 4.

12. The polyurethane grout composition of claim 1, wherein the proportion of the monofunctional hydroxyl containing compound by weight percentage of the prepolymer is between 1 and 3.

* * * * *